(12) United States Patent (10) Patent No.: US 8,112,133 B2
Minamide et al. (45) Date of Patent: Feb. 7, 2012

(54) KEYPAD AND SLIDE TYPE MOBILE TERMINAL HAVING THE SAME

(75) Inventors: Keiichi Minamide, Tokyo (JP); Norio Okada, Tokyo (JP); Hideki Hayashi, Tokyo (JP); Jong Seong Lee, Tokyo (JP)

(73) Assignee: Samsung Electronics Co., Ltd., Suwon-si (KR)

( * ) Notice: Subject to any disclaimer, the term of this patent is extended or adjusted under 35 U.S.C. 154(b) by 450 days.

(21) Appl. No.: 12/343,649

(22) Filed: Dec. 24, 2008

(65) Prior Publication Data

US 2009/0170576 A1 Jul. 2, 2009

(30) Foreign Application Priority Data

Dec. 27, 2007 (KR) ........................ 10-2007-0138139

(51) Int. Cl.
*H04M 1/00* (2006.01)
(52) U.S. Cl. ............. 455/575.4; 379/433.12; 455/550.1; 455/90.1
(58) Field of Classification Search ............... 455/575.4, 455/90.1, 550.1; 345/173; 379/433.12
See application file for complete search history.

(56) References Cited

U.S. PATENT DOCUMENTS

| | | | |
|---|---|---|---|
| 6,370,362 B1 * | 4/2002 | Hansen et al. ............... | 455/90.1 |
| 6,785,565 B2 * | 8/2004 | Gventer ...................... | 455/575.4 |
| 6,864,881 B2 * | 3/2005 | Lee .............................. | 345/168 |
| 6,996,426 B2 * | 2/2006 | Granberg .................... | 455/575.4 |
| 7,324,642 B2 * | 1/2008 | Pletikosa .................. | 379/433.12 |
| 7,511,479 B2 * | 3/2009 | Schuler et al. .............. | 324/207.2 |
| 2003/0119544 A1 * | 6/2003 | Gventer ....................... | 455/550 |
| 2003/0222852 A1 * | 12/2003 | Lee ............................... | 345/168 |
| 2006/0135199 A1 * | 6/2006 | Richter et al. ............. | 455/550.1 |
| 2007/0135184 A1 * | 6/2007 | Pletikosa ................... | 455/575.1 |
| 2009/0264168 A1 * | 10/2009 | Wang et al. ................ | 455/575.4 |
| 2010/0000845 A1 * | 1/2010 | Zou et al. ...................... | 200/293 |

FOREIGN PATENT DOCUMENTS

GB 2 347 894 A * 9/2000
* cited by examiner

*Primary Examiner* — Rafael Pérez-Gutiérrez
*Assistant Examiner* — Joseph Arévalo
(74) *Attorney, Agent, or Firm* — H.C. Park & Associates, PLC

(57) ABSTRACT

A keypad and a slide type mobile terminal having the same are provided. The slide type mobile terminal includes a first main body; a keypad having an upper surface part and a lower surface part, and a second main body coupled to the first plate positioned at one end of the upper surface part of the keypad and slidably connected to the first main body. The upper surface part has a plurality of parallel first plates that form an upper surface of the keypad, and the first plates positioned at each end of the upper surface part each have a downward facing first latch disposed at one side thereof and the remaining first plates each have a downward facing first latch disposed at two sides thereof. The lower surface part has a plurality of parallel second plates that form a lower surface of the keypad, and each second plate has an upward facing second latch disposed at two sides thereof. One second latch of each second plate contacts an adjacent first latch.

17 Claims, 11 Drawing Sheets

KEYPAD AND SLIDE TYPE MOBILE TERMINAL HAVING THE SAME

CROSS REFERENCE TO RELATED APPLICATION

This application claims priority from and the benefit of Korean Patent Application No. 10-2007-0138139, filed on Dec. 27, 2007, which is hereby incorporated by reference for all purposes as if fully set forth herein.

BACKGROUND OF THE INVENTION

1. Field of the Invention

The present invention relates to a keypad and a slide type mobile terminal having the same, and more particularly, to a keypad and a slide type mobile terminal having key display units positioned between key detectors when a sliding key is pressed and a second main body that slides to open a first main body to establish a sufficient separation between keys.

2. Discussion of the Background

In general, a mobile terminal may be classified as a bar type, a flip type, a folder type, or a slide type according to its external appearance.

The bar type mobile terminal includes a key input unit, which is a data input means, a display unit, which is a data output means, a mouthpiece module, and an earpiece module mounted in a main body housing, and may be advantageous because of its simple configuration.

The flip type mobile terminal includes a main body, flip cover, and hinge to rotatably connect the main body and the flip cover. The main body of the flip type mobile terminal has the same configuration as the bar type mobile terminal, and the flip cover covers a key input unit on the main body, such that in a communication standby mode, erroneous operation of the key input unit may be prevented.

The folder type mobile terminal includes a main body, folder body, and hinge to rotatably connect the main body and the folder body, and the folder body is opened and closed by rotating relative to the main body. When the folder body is closed on the main body, the folder type mobile terminal is in a communication standby mode, and the folder body covers a key input unit of the main body, thereby preventing erroneous operation of the key input unit. In a communication mode, the folder body is opened and thus a distance between a mouthpiece and an earpiece is maximized. The folder type mobile terminal may be advantageous because it may have a decreased size.

In the slide type mobile terminal, a function is performed when a slider body attached to a main body slides relative to the main body. For example, by sliding the slider body a display installed in a front surface of the slider body may be turned on, an incoming call may be received, or a desired function key of a plurality of keys installed in a front surface of the main body may be pressed.

When the size of the mobile terminal is decreased there may be a narrow gap between keys. As such, erroneous operation may occur frequently when manipulating keys.

SUMMARY OF THE INVENTION

The present invention provides a keypad and a slide type mobile terminal having the same that may enable easier manipulation of a key input unit.

The present invention also provides a keypad and a slide type mobile terminal having the same in which a second main body slides on a first main body when a sliding key is pressed.

The present invention also provides a keypad and a slide type mobile terminal having the same in which a plurality of key display units and key detectors sequentially slide when the second main body slides.

Additional features of the invention will be set forth in the description which follows, and in part will be apparent from the description, or may be learned by practice of the invention.

The present invention discloses a keypad including an upper surface part and a lower surface part. The upper surface part has a plurality of parallel first plates that form an upper surface of the keypad. The first plates positioned at each end of the upper surface part each have a downward facing first latch disposed at one side thereof, and the remaining first plates each have a downward facing first latch disposed at two sides thereof. The lower surface part has a plurality of parallel second plates that form a lower surface of the keypad, and each second plate has an upward facing second latch disposed at two sides thereof. One second latch of each second plate contacts an adjacent first latch.

The present invention also discloses a slide type mobile terminal including a first main body, a keypad having an upper surface part and a lower surface part, and a second main body coupled to the first plate positioned at one end of the upper surface part of the keypad and slidably connected to the first main body. The upper surface part has a plurality of parallel first plates that form an upper surface of the keypad, and the first plates positioned at each end of the upper surface part each have a downward facing first latch disposed at one side thereof and the remaining first plates each have a downward facing first latch disposed at two sides thereof. The lower surface part has a plurality of parallel second that form a lower surface of the keypad, and each second plate has an upward facing second latch disposed at two sides thereof. One second latch of each second plate contacts an adjacent first latch.

The present invention also discloses a first key member including a function key and first key display unit that are integrally formed, a second key member including a first key detector and second key display unit that are integrally formed, a third key member including a second key detector and third key display unit that are integrally formed, a fourth key member including a third key detector and fourth key display unit are integrally formed, and a fifth key member including a fourth key detector. Each key detector includes a first latch protruding downward, and each key display unit includes a second latch protruding upward. The key members are sequentially arranged such that the first latches alternate with the second latches.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
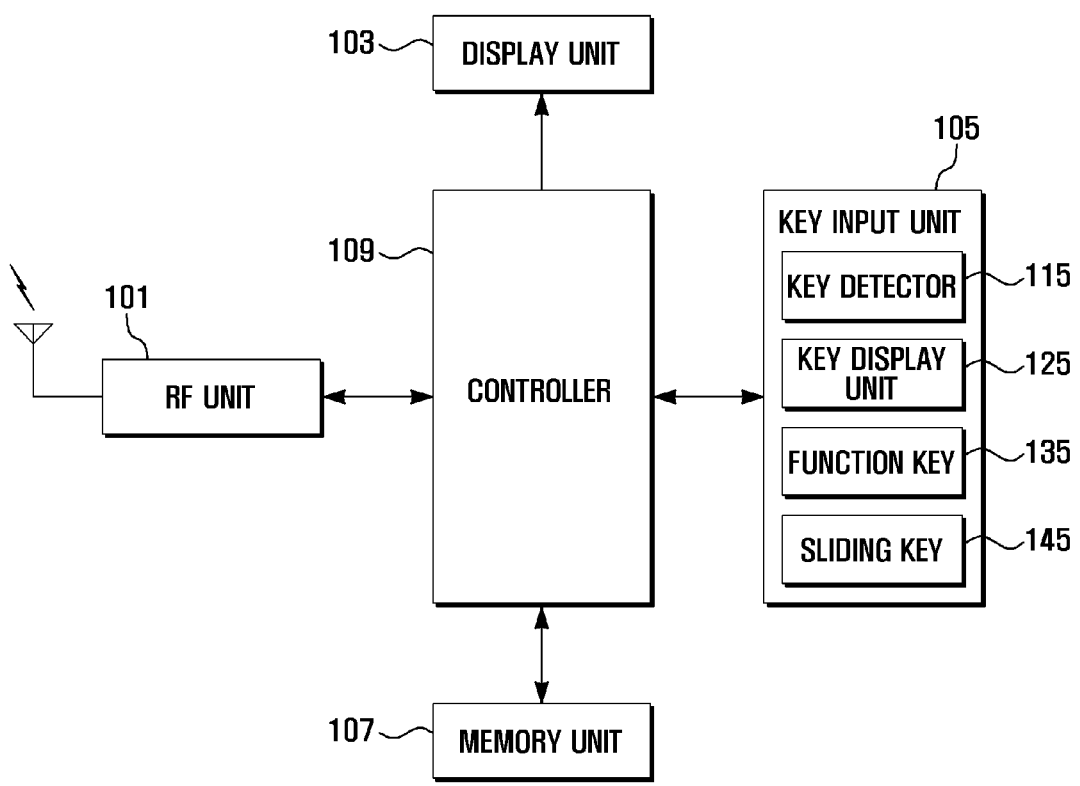
FIG. 1 is a block diagram showing a configuration of a slide type mobile terminal according to an exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present.

In the following description, a slide type mobile terminal is exemplified, however the present invention is not limited thereto. A mobile terminal according to an exemplary embodiment of the present invention may be any information and communication appliance or multimedia appliance such as a mobile terminal, mobile phone, wired/wireless phone, portable multimedia player (PMP), personal digital assistant (PDA), or smart phone, and applications thereof.

Figure 2:
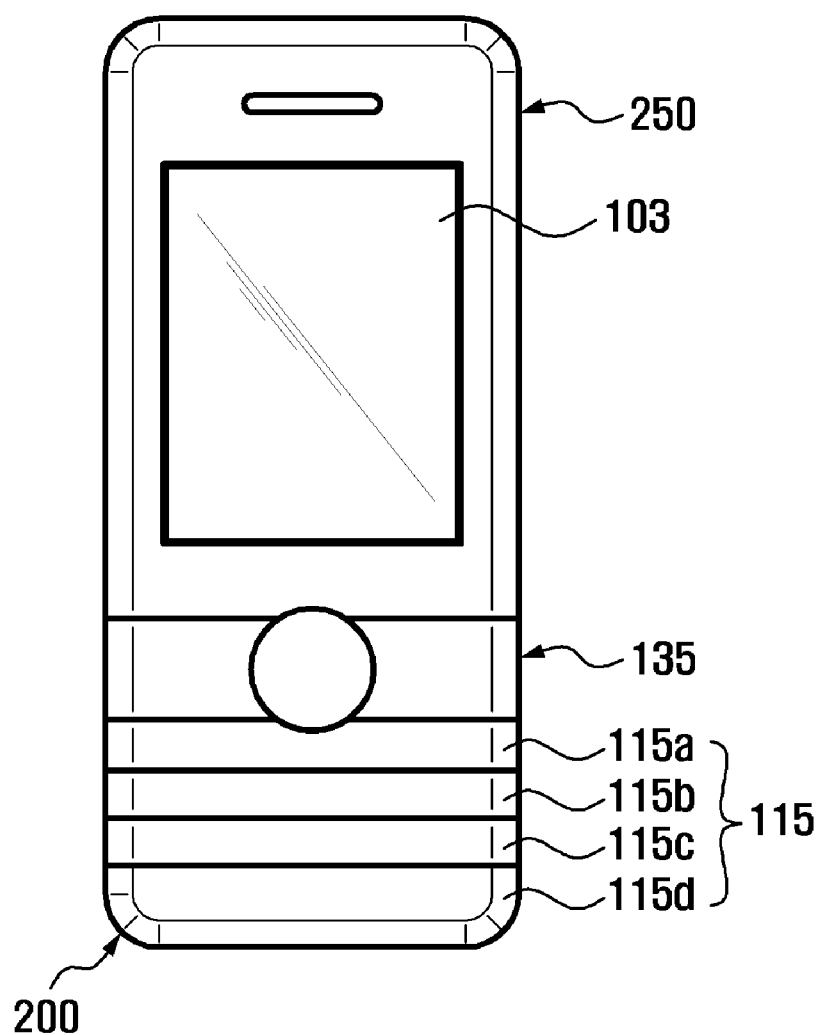
FIG. 2 is a front view showing a closed state of the slide type mobile terminal of FIG. 1.
Figure 3:
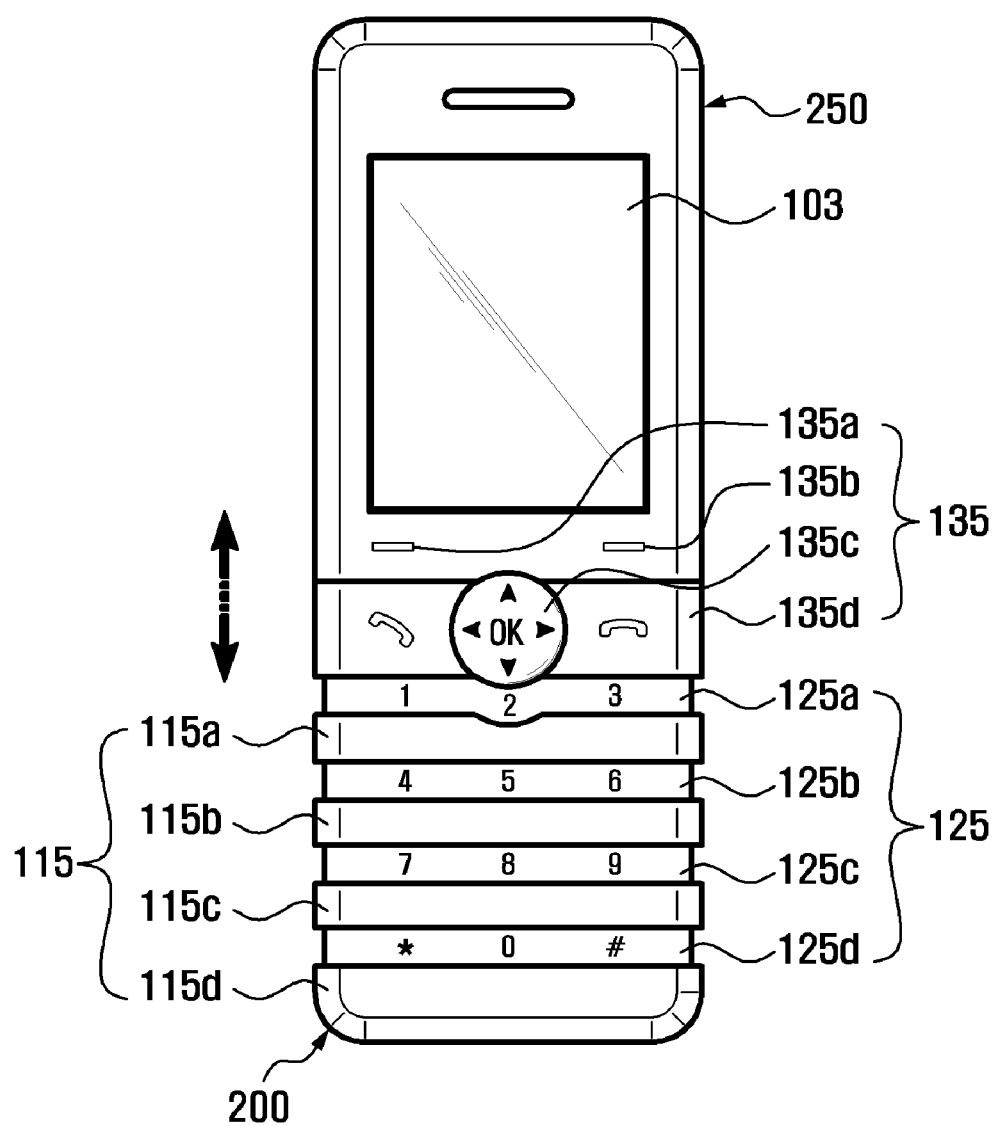
FIG. 3 is a front view showing an open state of the slide type mobile terminal of FIG. 1.
Figure 4:
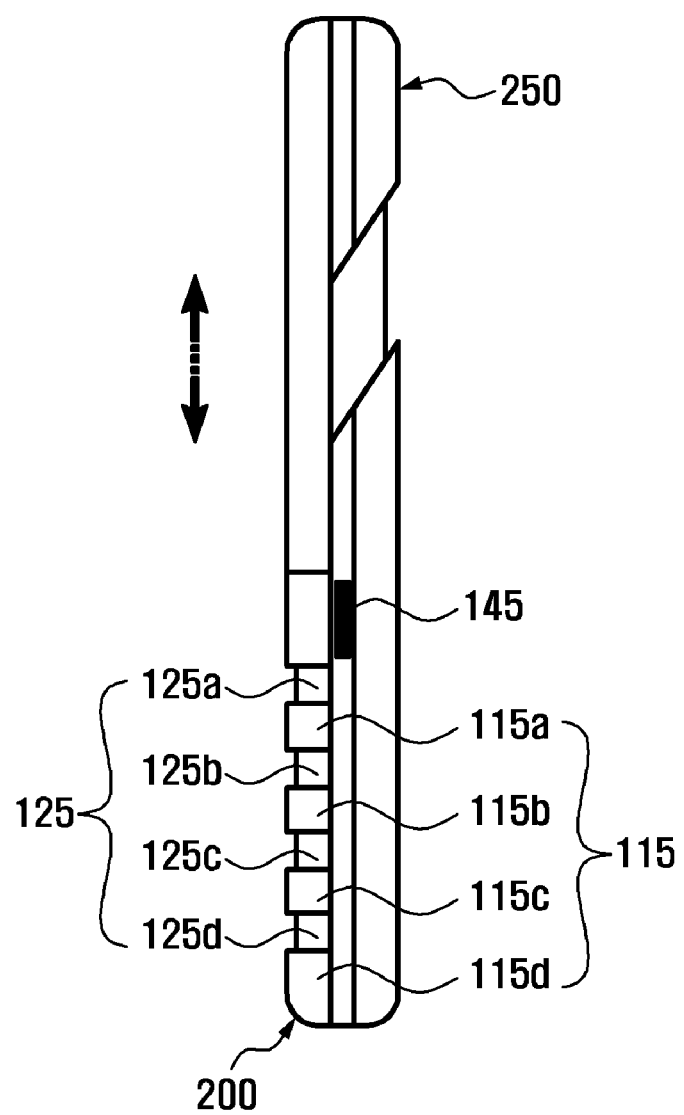
FIG. 4 is a side view of the mobile terminal of FIG. 1 in an open state.
Figure 5:
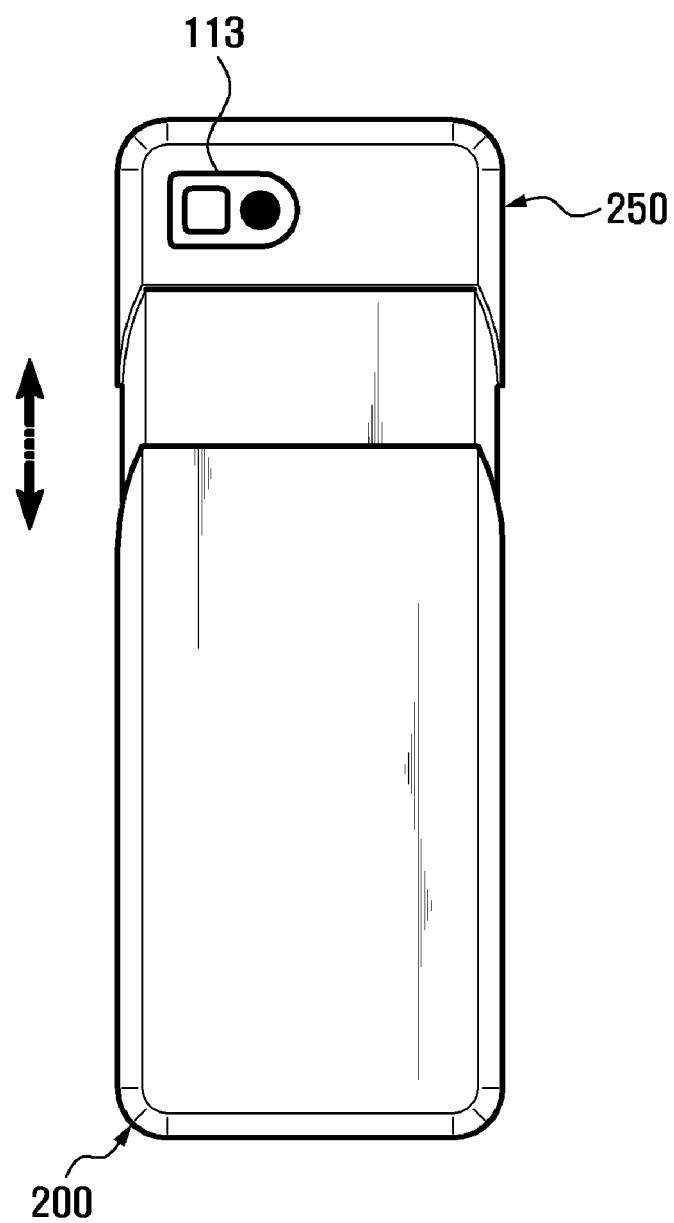
FIG. 5 is a rear view of the mobile terminal of FIG. 1 in an open state.

FIG. 1 is a block diagram showing a configuration of a slide type mobile terminal according to an exemplary embodiment of the present invention. FIG. 2 is a front view showing a closed state of the slide type mobile terminal of FIG. 1. FIG. 3 is a front view showing an open state of the slide type mobile terminal of FIG. 1. FIG. 4 is a side view of the mobile terminal of FIG. 1 in an open state. FIG. 5 is a rear view of the mobile terminal of FIG. 1 in an open state.

Referring to FIG. 1, the mobile terminal includes a radio frequency (RF) unit 101, display unit 103, key input unit 105, memory unit 107, and controller 109.

The RF unit 101 performs a wireless communication function of the mobile terminal. The RF unit 101 includes an RF transmitter to up-convert a frequency of a signal to be transmitted and amplify the signal, and an RF receiver to low-noise amplify a received signal and down-convert a frequency of the signal.

In the present exemplary embodiment, a mobile terminal including the RF unit 101 is exemplified, however the present invention may also be applied to a terminal that does not have the RF unit 101, for example, a terminal having no call function.

The display unit 103 displays various information related to the state and operation of the mobile terminal. According to the present exemplary embodiment, when the mobile terminal is in an open state, the display unit 103 displays information. The display unit 103 is generally locked in an off state when the mobile terminal is in a closed state. However, according to a user's setting, even in a closed state, the display function of the display unit 103 may be enabled.

The display unit 103 may include a liquid crystal display (LCD), and when the display unit 103 includes the LCD, the display unit 103 may include an LCD controller and an LCD display element. If the LCD is embodied with a touch screen method, the display unit 103 may be operated as an input unit.

The key input unit 105 enables input by a user of signals to control operation of the mobile terminal. The key input unit 105 is a keypad and includes a plurality of first plates that form an upper surface part and a plurality of second plates that form a lower surface part. The first plates of the key input unit 105 include function keys 135 and key detectors 115, and the second plates of the key input unit 105 include key display units 125. When the mobile terminal is closed, the key display units 125 are positioned at a lower part of the key detectors 115 and the function keys 135.

In the upper surface part of the key input unit 105, the first plate positioned at one end thereof includes the function keys 135. The remaining first plates of the upper surface part and the second plates forming the lower surface part of the key input unit 105 are formed in pairs having one first plate and one second plate.

The key input unit 105 further includes a sliding key 145. The key detectors 115 are locked in an off state when the mobile terminal is closed and operate when the mobile terminal is open.

The upper surface part of the key input unit 105 has a structure in which a plurality of first plates are arranged in a row form and includes first, second, third, and fourth key detectors 115a, 115b, 115c, and 115d, as shown in FIG. 2. Each of the first, second, third, and fourth key detectors 115a, 115b, 115c, and 115d has three touch sensors. The user can perform a desired manipulation by touching one of the key detectors 115a, 115b, 115c, and 115d. When a touch occurs through the touch sensor, the touched key detector 115a, 115b, 115c, or 115d detects a change of a physical quantity, for example resistance and capacitance, and thereby detects occurrence of the touch. The key detectors 115 further include a signal converter, and the signal converter converts a change of a physical quantity to a touch signal.

The lower surface part of the key input unit 105 has a structure in which a plurality of second plates are arranged in a row form, as with the key detectors 115, and includes the key display units 125, which includes first, second, third, and fourth key display units 125a, 125b, 125c, and 125d formed in pairs with the first, second, third, and fourth key detectors 115a, 115b, 115c, and 115d, respectively. In a closed state, each key display unit 125a, 125b, 125c, and 125d is disposed at a lower part of the corresponding key detector 115a, 115b, 115c, and 115d and is hidden thereby, and in an open state, the key display units 125a, 125b, 125c, and 125d are disposed between the first, second, third, and fourth key detectors 115a, 115b, 115c, and 115d, as shown in FIG. 3. In an open state, each of the first, second, third, and fourth key display units 125a, 125b, 125c, and 125d is positioned adjacent to the upper part of the corresponding first, second, third, and fourth key detectors 115a, 115b, 115c, and 115d. Because the key detectors 115 have no identification mark on a surface thereof, a key of the key detector 115a, 115b, 115c, or 115d is identified through the corresponding key display unit 125a, 125*b*, 125*c*, or 125*d*. Because the first, second, third, and fourth key detectors 115*a*, 115*b*, 115*c*, and 115*d* are separated by the first, second, third, and fourth key display units 125*a*, 125*b*, 125*c*, and 125*d*, a gap between the keys may be created. Further, when the mobile terminal is opened, the key display units 125 may be set to illuminate to aid identification thereof.

The function keys 135 may be call communication function keys and may include a menu key 135*a*, a confirm key 135*b*, a navigation key 135*c*, and a communication and end key 135*d*. The function keys 135 are provided in a second main body 250 of the mobile terminal, and are locked in an inoperable state when the mobile terminal is in a closed state. The function keys 135 are illuminated when the mobile terminal is in an open state. The function keys 135 may have touch sensors, similarly to the key detectors 115, and may sense user input to execute a function selected by a touch.

A sliding key 145 to open the mobile terminal by sliding the second main body 250 is provided at a side surface of the mobile terminal, as shown in FIG. 4. However, the position of the sliding key 145 is not limited thereto. The sliding key 145 locks the mobile terminal in a closed state in order to prevent sliding thereof. When the sliding key 145 is pressed by the user, the lock is released, and the second main body 250, the key display units 125, and the key detectors 115 slide sequentially due to an elastic member.

The memory unit 107 stores programs and information necessary for operation of the mobile terminal. The memory unit 107 locks operation of a function of the display unit 103 and the key input unit 105 in a closed state of the mobile terminal and stores a program to release the lock of the functions and to illuminate the key display units 125 and the function keys 135 in an open state of the mobile terminal.

The controller 109 controls general operations of constituent units of the mobile terminal. The controller 109 controls the lock and release of the key input unit 105 according to the closing and opening of the mobile terminal. The controller 109 detects a touch of the key detectors 115 and the function keys 135, performs a function requested by the user, and displays the function in the display unit 103.

Referring to FIG. 2, the mobile terminal includes a first main body 200 and the second main body 250. The first main body 200 may be integrally formed with the fourth key detector 115*d*. The second main body 250 may slide while contacting the first main body 200 and includes the display unit 103 and the function keys 135. The first main body 200 may further include the controller 109, the memory unit 107, and a microphone, and the second main body 250 may further include a speaker.

As shown in FIG. 2, in a closed state of the mobile terminal, the display unit 103, function keys 135, and key detectors 115 are locked in an inoperable state.

Referring to FIG. 3, in an open state of the mobile terminal, the lock of the display unit 103, function keys 135, and key detectors 115 is released. Accordingly, the function keys 135 and the key display units 125 are illuminated and display a function of each key. If the sliding key 145 is pressed, the second main body 250 having the function keys 135 slides outwards, and the first key display unit 125*a*, first key detector 115*a*, second key display unit 125*b*, second key detector 115*b*, third key display unit 125*c*, third key detector 115*c*, and fourth key display unit 125*d* slide sequentially. Such a sliding operation is described below with reference to FIG. 6A, FIG. 6B, FIG. 6C, FIG. 6D, FIG. 6E, FIG. 7A, FIG. 7B, FIG. 7C, FIG. 7D, and FIG. 7E.

Referring to FIG. 5, a camera 113 is provided in the rear surface of the mobile terminal.

FIG. 6A, FIG. 6B, FIG. 6C, FIG. 6D, and FIG. 6E are views showing an operation of opening a slide type mobile terminal according to another exemplary embodiment of the present invention.

Figure 6A:
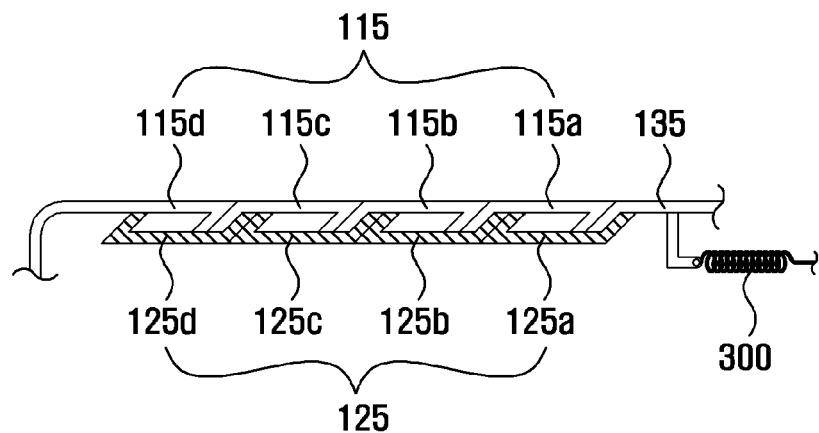
FIG. 6A, FIG. 6B, FIG. 6C, FIG. 6D, and FIG. 6E are views showing an operation of opening a slide type mobile terminal according to another exemplary embodiment of the present invention.

FIG. 6A is a cross-sectional view showing a closed state of the mobile terminal, as shown in FIG. 2. In a closed state of the mobile terminal, the function keys 135 contact the first key detector 115*a*, first key detector 115*a* contacts the second key detector 115*b*, the second key detector 115*b* contacts the third key detector 115*c*, and the third key detector 115*c* contacts the fourth key detector 115*d*. The function keys 135 are connected to an elastic member 300 connected to the sliding key 145. Here, the elastic member 300 may be a spring. The elastic member 300 may be compressed in a closed state of the mobile terminal. The key display units 125 are disposed in a lower part of the key detectors 115. The key detectors 115 and the key display units 125 are engaged with each other to prevent separation.

Figure 6B:
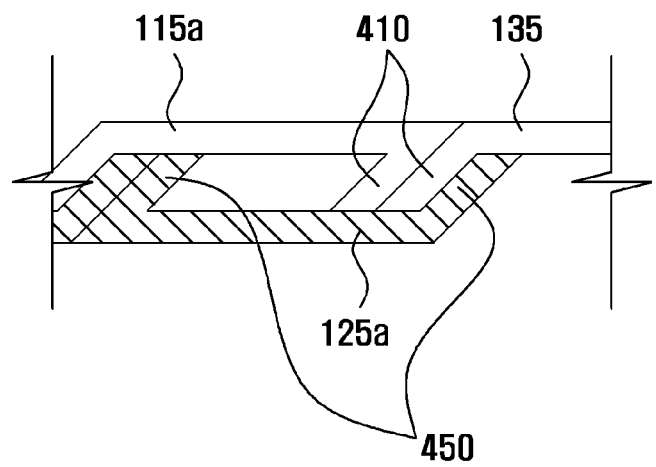

FIG. 6B is an enlarged view of a portion of FIG. 6A. The function keys 135 and the key detectors 115*a*, 115*b*, 115*c*, and 115*d* may each include at least one first latch 410 protruding downward, and the key display units 125*a*, 125*b*, 125*c*, and 125*d* may each include at least one second latch 450 protruding upward. The function keys 135 include one first latch 410 formed at the left side, the fourth key detector 115*d* includes one first latch 410 formed at the right side, and the first, second, and third key detectors 115*a*, 115*b*, and 115*c* each include one first latch 410 formed at each side thereof.

Referring to FIG. 6B, the first latch 410 of the function keys 135 contacts the first latch 410 at the right side of the first key detector 115*a*, and the second latch 450 at the right side of the first key display unit 125*a* is engaged with the first latch 410 of the function keys 135.

Figure 6C:
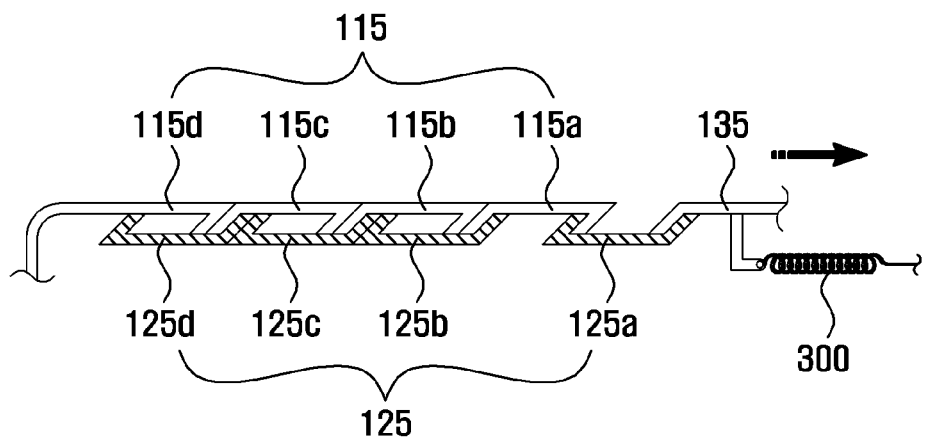

FIG. 6C shows a state in which the sliding key 145 is pressed and the second main body 250 slides. When the sliding key 145 is pressed, the elastic member 300 connected to the sliding key 145 extends, thereby opening the mobile terminal. Accordingly, the function keys 135 of the second main body 250 connected to the elastic member 300 slide outward (that is, to the right side, as shown in FIG. 6C).

Figure 6D:
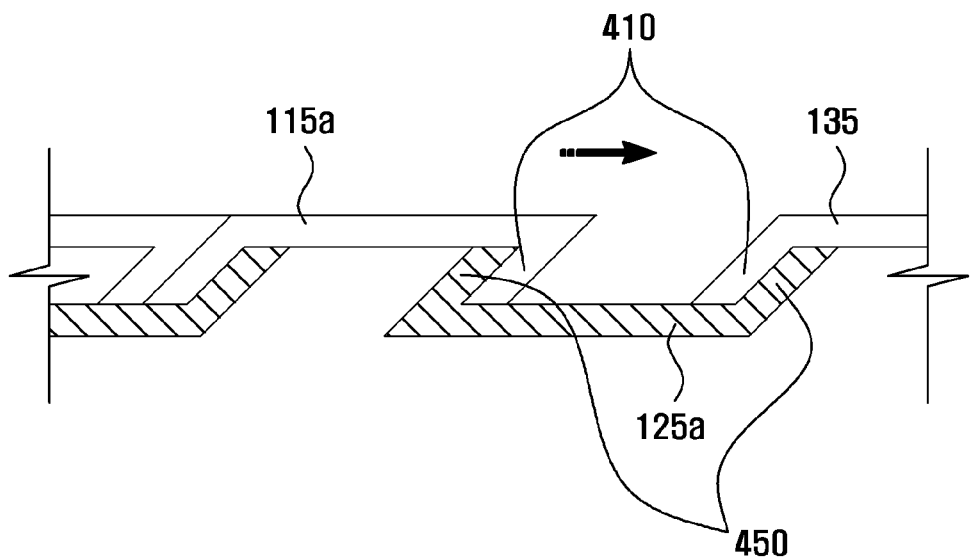

FIG. 6D is an enlarged view of a portion of FIG. 6C. Referring to FIG. 6D, as the function keys 135 move, the first key display unit 125*a* slides with the first latch 410 of the function keys 135 because the second latch 450 at the right side of the first key display unit 125*a* is engaged with the first latch 410 of the function keys 135. The first key detector 115*a* slides with the second latch 450 at the left side of the first key display unit 125*a* once the second latch 450 engages the first latch 410 at the right side of the first key detector 115*a*. In the same manner, the second key display unit 125*b*, second key detector 115*b*, third key display unit 125*c*, third key detector 115*c*, and fourth key display unit 125*d* slide sequentially when the second main body 250 slides.

Figure 6E:
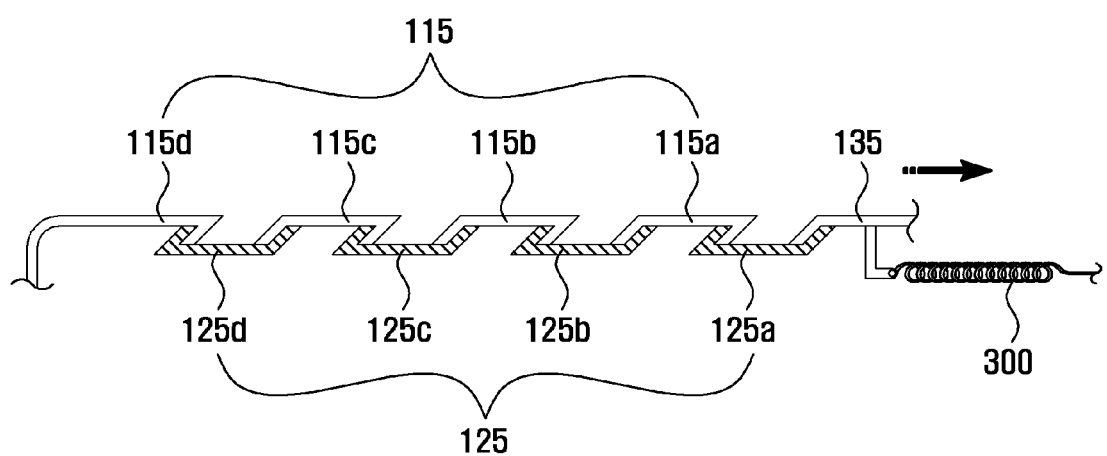

FIG. 6E shows an open state of the mobile terminal. Through the above-described operation, the elastic member 300 is extended to a maximum limit, and the function keys 135, the key display units 125, and the key detectors 115, except for the fourth key detector 115*d*, have all slid.

FIG. 7A, FIG. 7B, FIG. 7C, FIG. 7D, and FIG. 7E are views showing an operation of opening a slider body in a slide type mobile terminal according to another exemplary embodiment of the present invention.

Figure 7A:
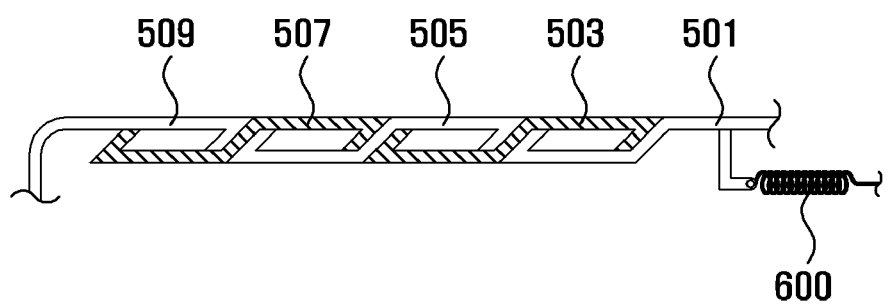
FIG. 7A, FIG. 7B, FIG. 7C, FIG. 7D, and FIG. 7E are views showing an operation of opening a slide type mobile terminal according to another exemplary embodiment of the present invention.

FIG. 7A is a cross-sectional view showing a closed state of the mobile terminal, as shown in FIG. 2.

In the present exemplary embodiment, a function key and first key display unit are integrally formed as a first key member 501, a first key detector and second key display unit are integrally formed as a second key member 503, a second key detector and third key display unit are integrally formed as a third key member 505, and a third key detector and fourth key display unit are integrally formed as a fourth key member 507. The fourth key detector is described as a fifth key member 509.

In a closed state of the mobile terminal, the function key of the first key member 501 contacts the key detector of the second key member 503. The first key member 501 is connected to an elastic member 600 connected to the sliding key 145. The elastic member 600 may be a spring. The elastic member 600 sustains a compressed state when the mobile terminal is in a closed state and the first, second, third, fourth, and fifth key members 501, 503, 505, 507, and 509 are not separated. A detailed structure of the first, second, third, fourth, and fifth key members 501, 503, 505, 507, and 509 is described with reference to FIG. 7B.

Figure 7B:
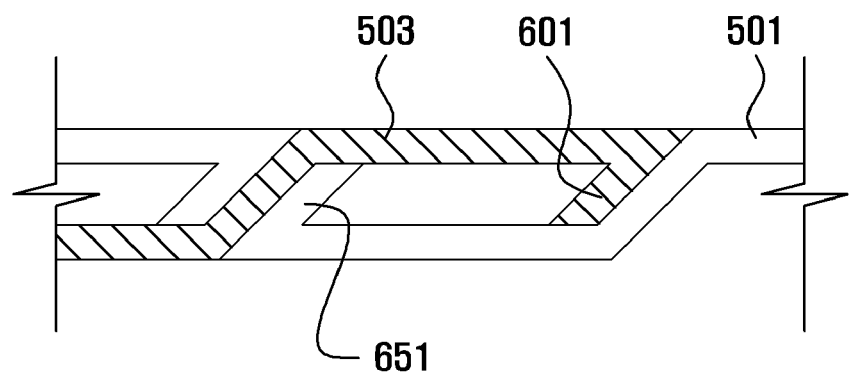

FIG. 7B is an enlarged view of a portion of FIG. 7A. The key detectors of the second, third, fourth, and fifth key members 503, 505, 507, and 509 each include a third latch 601 protruding downward, and the key display units of the first, second, third, and fourth key members 501, 503, 505, and 507 each include a fourth latch 651 protruding upward. When the slider body moves, the first, second, third, fourth, and fifth key members 501, 503, 505, 507, and 509 are prevented from separating by engagement of the third latches 601 with the fourth latches 651.

Figure 7C:
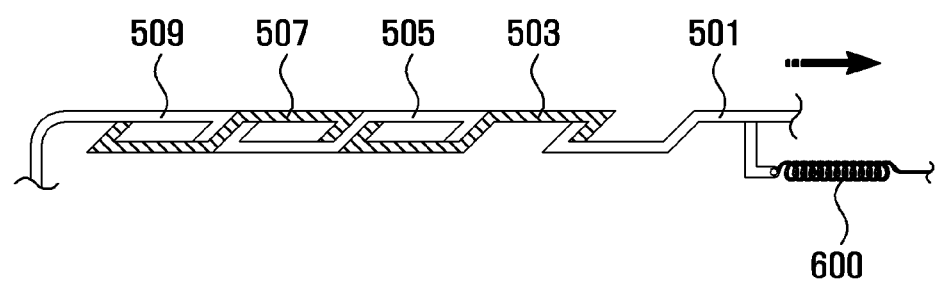

FIG. 7C shows a state in which the second main body 250 slides when the sliding key 145 is pressed. When the sliding key 145 is pressed, the elastic member 600 connected to the sliding key 145 extends, thereby opening the mobile terminal. As a result, the first key member 501 of the second main body 250 connected to the elastic member 600 slides outward (that is, to the right side, as shown in FIG. 7C).

Figure 7D:
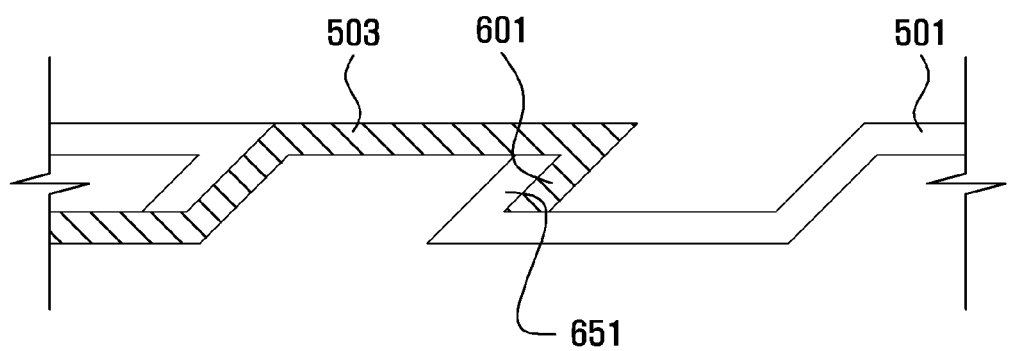

FIG. 7D is an enlarged view of a portion of FIG. 7C. Referring to FIG. 7D, the key display unit of the first key member 501 is exposed according to movement of the first key member 501. The second key member 503 slides by engagement of the third latch 601 of the second key member 503 with the fourth latch 651 of the first key member 501, and thus the key display unit of the second key member 503 is exposed. Thereafter, as the third key member 505 slides, the key display unit of the third key member 505 is exposed, and as the fourth key member 507 slides, the key display unit of the fourth key member 507 is exposed.

Figure 7E:
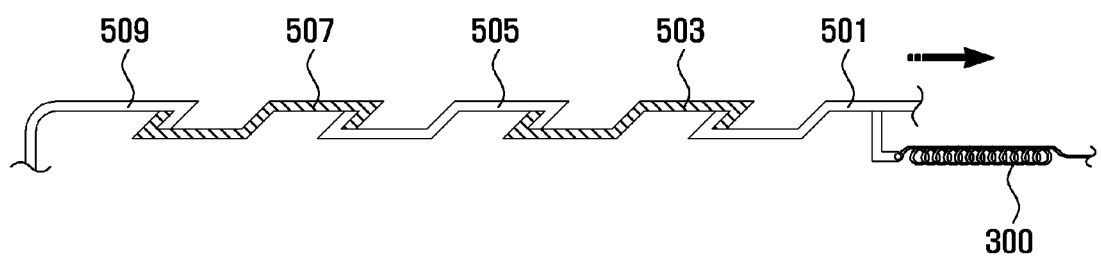

FIG. 7E shows an open state of the mobile terminal. Through the above-described operation, as the elastic member 600 extends to a maximum limit and the first, second, third, and fourth key members 501, 503, 505, and 507 slide, the first, second, third, and fourth key display units are exposed.

An opening operation of the mobile terminal may be performed by pressing a sliding key; however the mobile terminal may also be opened/closed by a physical force of a user.

According to exemplary embodiments of the present invention, because separation between keys is established, key input errors may be prevented.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A keypad, comprising:
   an upper surface part comprising a plurality of parallel first plates that form an upper surface of the keypad, wherein the first plates positioned at each end of the upper surface part each comprise a downward facing first latch disposed at one side thereof, and the remaining first plates each comprise a downward facing first latch disposed at and extending from two sides of the remaining first plates; and
   a lower surface part comprising a plurality of parallel second plates that form a lower surface of the keypad, wherein each second plate comprises an upward facing second latch disposed at two sides thereof,
   wherein one second latch of each second plate is configured to contact an adjacent first latch.

2. The keypad of claim 1, wherein one of the upper surface part and the lower surface part comprises key detectors to detect a key manipulation, and the other one of the upper surface part and the lower surface part comprises key display units to display a function of the key.

3. The keypad of claim 2, wherein the first plate positioned at one end of the upper surface part is slidable, and when the slidable first plate slides, the other first plates and the second plates slide to engage the first latches with the second latches, and the second plates are exposed between the first plates.

4. The keypad of claim 2, wherein the first plate positioned at one end of the upper surface plate is a function key and the remaining first plates are a first key detector, a second key detector, a third key detector, and a fourth key detector, and the second plates are a first key display unit, a second key display unit, a third display unit, and a fourth key display unit.

5. The keypad of claim 4, wherein the function key, first key display unit, first key detector, second key display unit, second key detector, third key display unit, third key detector, and fourth key display unit slide sequentially.

6. The keypad of claim 1, wherein each first latch is arranged between the first latch of an adjacent first plate and the second latch of a corresponding second plate.

7. The keypad of claim 1, wherein the downward facing first latch integrally extends from the two sides of the remaining first plates.

8. A mobile terminal, comprising:
   a first main body;
   a keypad comprising an upper surface part and a lower surface part, the upper surface part comprising a plurality of parallel first plates that form an upper surface of the keypad, wherein the first plates positioned at each end of the upper surface part each comprise a downward facing first latch disposed at one side thereof and the remaining first plates each have a downward facing first latch disposed at and extending from two sides of the remaining first plates, and the lower surface part comprises a plurality of parallel second plates that form a lower surface of the keypad, wherein each second plate has an upward facing second latch disposed at two sides thereof, and one second latch of each second plate is configured to contact an adjacent first latch; and
   a second main body coupled to the first plate positioned at one end of the upper surface part of the keypad and slidably connected to the first main body.

9. The mobile terminal of claim 8, wherein one of the upper surface part and the lower surface part of the keypad comprises key detectors to detect a key manipulation, and the other one of the upper surface part and the lower surface part of the keypad comprises key display units to display a function of the key.

10. The mobile terminal of claim 9, wherein the first plates and the second plates move to engage the first latches with the second latches thereof when the second main body slides relative to the first main body, and the second plates are exposed between the first plates.

11. The mobile terminal of claim 9, wherein the first plate positioned at one end of the keypad is a function key and the remaining first plates are a first key detector, a second key detector, a third key detector, and a fourth key detector, and the second plates of the keypad are a first key display unit, a second key display unit, a third key display unit, and a fourth key display unit.

12. The mobile terminal of claim 11, wherein the function key, first key display unit, first key detector, second key display unit, second key detector, third key display unit, third key detector, and fourth key display unit slide sequentially when the second main body slides relative to the first main body.

13. The mobile terminal of claim 8, wherein each first latch is arranged between the first latch of an adjacent first plate and the second latch of a corresponding second plate.

14. The mobile terminal of claim 8, wherein the downward facing first latch integrally extends from the two sides of the remaining first plates.

15. A keypad, comprising:
a first key member comprising a function key and first key display unit that are integrally formed;
a second key member comprising a first key detector and second key display unit that are integrally formed;
a third key member comprising a second key detector and third key display unit that are integrally formed;
a fourth key member comprising a third key detector and fourth key display unit that are integrally formed; and
a fifth key member comprising a fourth key detector;
wherein each key detector comprises a first latch protruding downward,
wherein each key display unit comprises a second latch protruding upward, and
wherein the key members are sequentially arranged such that the first latches alternate with the second latches.

16. The keypad of claim 15, wherein the first latches engage with the second latches when the key members slide, thereby exposing the key display units.

17. The keypad of claim 15, wherein the first, second, third, and fourth key display units are formed to display a function of at least one key thereon.

* * * * *